(12) United States Patent
Mack

(10) Patent No.: US 10,190,339 B1
(45) Date of Patent: Jan. 29, 2019

(54) SECUREMENT DEVICE FOR USE IN VEHICLES

(71) Applicant: Hornady Manufacturing Company, Grand Island, NE (US)

(72) Inventor: Matthew Mack, Grand Island, NE (US)

(73) Assignee: Hornady Manufacturing Company, Grand Island, NE (US)

( * ) Notice: Subject to any disclaimer, the term of this patent is extended or adjusted under 35 U.S.C. 154(b) by 0 days.

(21) Appl. No.: 15/936,697

(22) Filed: Mar. 27, 2018

Related U.S. Application Data

(60) Provisional application No. 62/576,113, filed on Oct. 24, 2017.

(51) Int. Cl.
| | | |
|---|---|---|
| *B60R 11/00* | (2006.01) | |
| *B60R 7/14* | (2006.01) | |
| *E05B 73/00* | (2006.01) | |
| *E05B 67/00* | (2006.01) | |

(52) U.S. Cl.
CPC ............ *E05B 73/0005* (2013.01); *B60R 7/14* (2013.01); *E05B 67/006* (2013.01); *B60R 11/00* (2013.01); *B60R 2011/005* (2013.01); *B60R 2011/0085* (2013.01); *B60R 2011/0096* (2013.01)

(58) Field of Classification Search
CPC ....... B60R 2011/005; B60R 2011/0085; B60R 2011/0096; B60R 2011/0007; B60R 2011/0012; B60R 7/14
USPC .......................................... 224/556, 555, 275
See application file for complete search history.

(56) References Cited

U.S. PATENT DOCUMENTS

| | | | |
|---|---|---|---|
| 3,865,166 A | 2/1975 | Pedro | |
| 4,489,833 A | 12/1984 | Bauer | |
| 4,922,642 A * | 5/1990 | Ohlhauser | B60R 7/14 211/64 |
| 5,845,885 A * | 12/1998 | Carnevali | F16M 11/14 248/181.1 |
| 6,705,498 B2 * | 3/2004 | Gantert | B60R 7/14 224/282 |
| 7,207,626 B2 * | 4/2007 | Hassett | B60N 3/103 297/188.06 |
| 7,478,870 B2 * | 1/2009 | Hassett | B60N 3/103 297/188.06 |
| 8,162,189 B2 * | 4/2012 | Robins | B60R 7/08 224/275 |
| 8,267,291 B2 * | 9/2012 | Simon | B60R 11/00 224/275 |
| 8,342,324 B2 | 1/2013 | Debias | |
| 9,530,266 B2 | 12/2016 | Delattre et al. | |
| 9,598,021 B2 * | 3/2017 | Noonan | F41C 33/041 |
| 2009/0108169 A1 * | 4/2009 | Gough | B60R 11/02 248/615 |
| 2010/0270201 A1 | 10/2010 | Cauley et al. | |
| 2017/0046899 A1 | 2/2017 | Delattre et al. | |
| 2017/0050575 A1 * | 2/2017 | Dara | B60R 7/14 |
| 2017/0267188 A1 | 9/2017 | Wilkinson | |
| 2018/0073836 A1 | 3/2018 | Romeo et al. | |

* cited by examiner

*Primary Examiner* — Justin Larson
(74) *Attorney, Agent, or Firm* — McHale & Slavin, P.A.

(57) ABSTRACT

A securement device for use in a vehicle. The device includes a retainer for holding or storing an object such as a firearm. The device utilizes an inflatable pillow to hold the device in position in the vehicle. It also includes an attachment that couples to the retainer and allows for adjustment of the orientation of the retainer.

10 Claims, 4 Drawing Sheets

SECUREMENT DEVICE FOR USE IN VEHICLES

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/576,113, entitled "SECUREMENT DEVICE FOR USE IN VEHICLES", filed Oct. 24, 2017. The contents of which the above referenced application is incorporated herein by reference.

FIELD OF THE INVENTION

A securement device particularly adapted for use in a vehicle. The device is configured to releasably retain an object associated with the device in a predetermined location and position in the vehicle.

BACKGROUND OF THE INVENTION

Devices such as gun safes for use in vehicles are well known in the art. They typically include a mounting device for permanent securement to the vehicle, for example, under the dashboard or under a seat. They will also typically include some type of retainer mechanism that will releasably retain a firearm, such as a pistol, to the mounting device. Such devices may also offer means for ejecting the retained firearm upon either a manual operation or electronic signal. Once the device is secured to the vehicle, it is typically a permanent securement of the device and does not allow for its repositioning or removal without significant effort. In addition, such devices are limited to the storage and securement of a single type of item. Also, because of the construction of the mounting device, the orientation of the retained item relative to a person in the vehicle is very limited. There is thus a need for an improved securement device for use in vehicles.

DESCRIPTION OF THE PRIOR ART

An example of a vehicle gun safe can be found in U.S. Publication No. 2018/0073836, to Romeo et al. The disclosure of this application is incorporated in its entirety herein by reference.

SUMMARY OF THE INVENTION

The present invention provides a securement device particularly adapted for use in a vehicle such as a car, SUV or truck, and is configured to retain an object, such as a pistol, at a predetermined orientation and location in the vehicle.

Accordingly, it is a primary objective of the instant invention to provide such a securement device wherein the predetermined orientation is adjustable.

It is a further objective of the instant invention to provide a securement device that may be easily located and releasably mounted at various positions in a vehicle.

It is yet another objective of the instant invention to provide such a securement device with means to secure it against removal from the vehicle within which it is mounted.

It is a still further objective of the invention to provide such a securement device that may be utilized with various types of object retainers.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
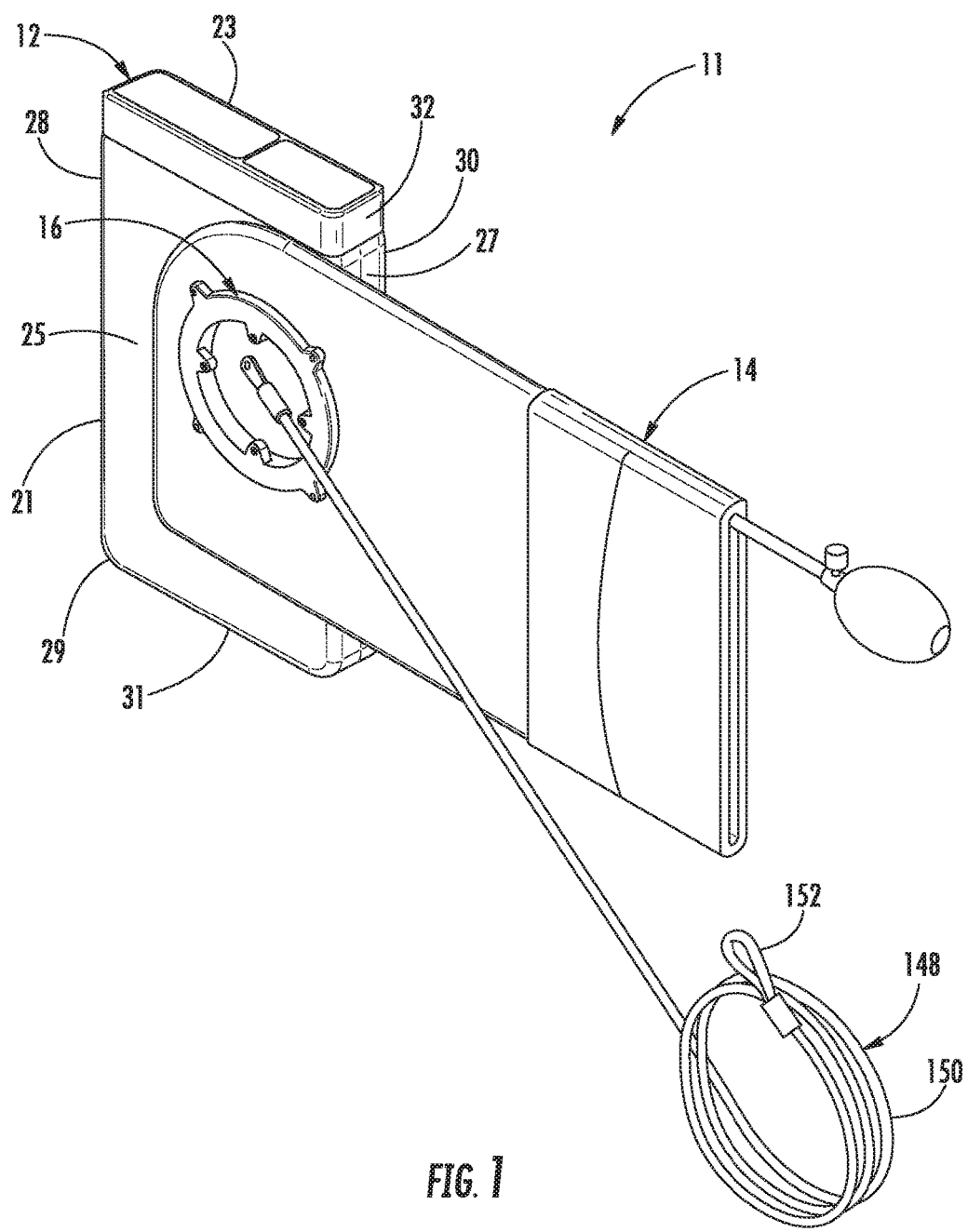
FIG. 1 is a perspective view of a securement device with one type of object retainer.

The reference numeral 11 represents, generally, a securement device for use in vehicles (not shown) such as trucks, cars and SUVs. The securement device 11 is operable to mount a retainer, designated generally 12, within the vehicle, allow it to be positioned at various orientations and various locations within the vehicle, and allow for its easy removal by an authorized person. The securement device 11 includes a mounting device 14 that can be coupled to the retainer 12, which allows mounting of the securement device within the vehicle in a releasable manner. The securement device 11 also includes an attachment device 16 coupled to the retainer 12 and operable to effect attachment of the retainer in a semi-permanent and preferably theft resistant manner to the vehicle. The attachment device 16 is operable to mount the retainer 12 to the mounting device 14 and allow for adjusting the orientation of the retainer 12 to both the mounting device 14 and the vehicle.

Figure 2:
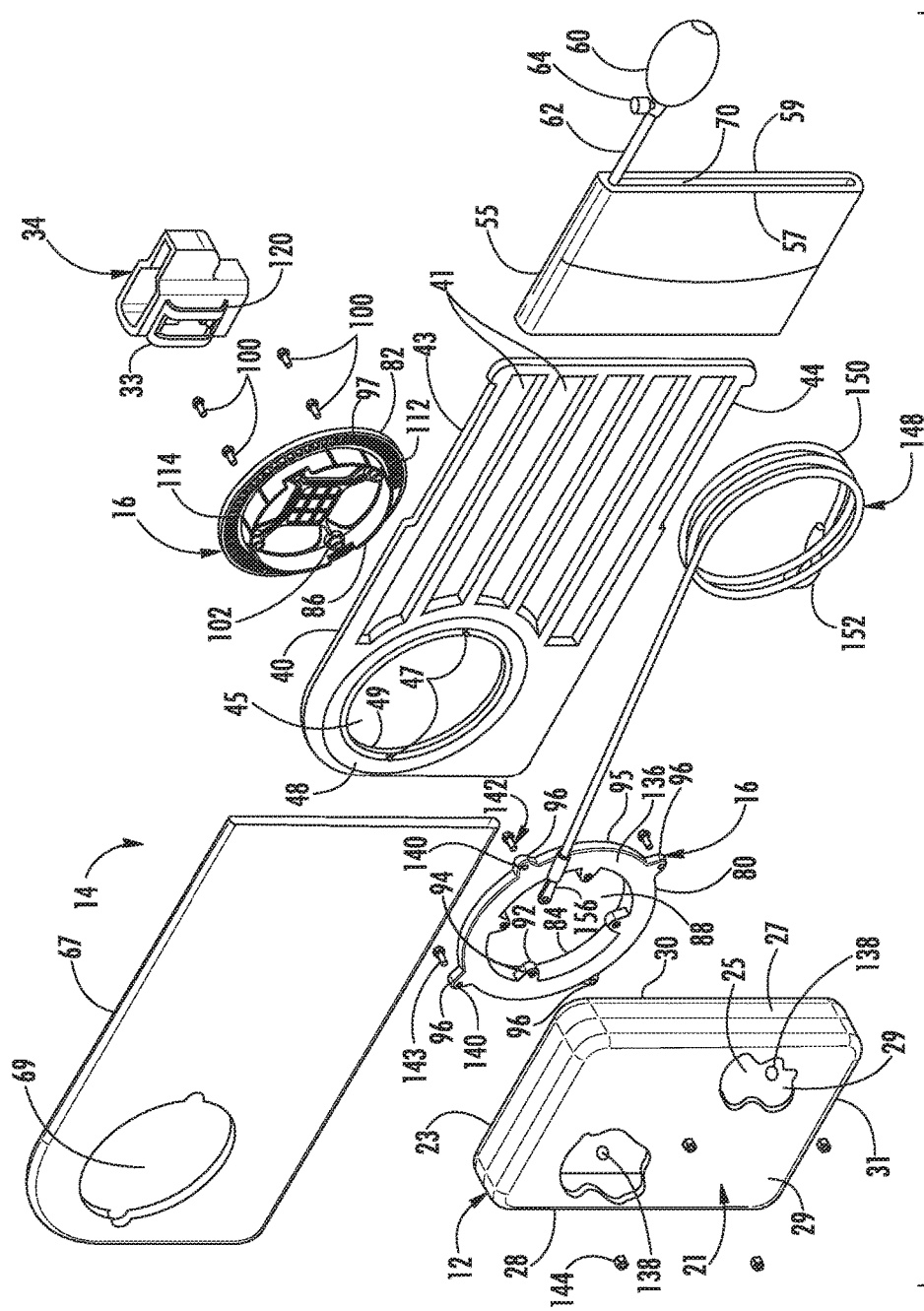
FIG. 2 is an exploded perspective view of the securement device including two types of object retainers.

The retainer 12 can be any suitable device. As shown in FIG. 1, the retainer 12 is in the form of a gun safe having a storage container 21 and a selectively openable cover or lid 23. Such a device is disclosed in U.S. Pat. No. 9,530,266 to Delattre et al., and U.S. Publication No. 2017/0046899 to Delattre et al. Opening may be effected either manually or electronically, and can include a lock mechanism (not shown) to selectively keep the cover 23 in a locked condition. The container 21 includes an internal storage chamber 25 in which a firearm or other valuable can be stored and out of sight. As shown, the container 21 has end walls 27 and 28, sidewalls 29 and 30, a bottom wall 31, and an open top 32. The cover 23 closes the open top 32. Alternately, or in addition to the container 21, the retainer 12 can be in the form of a holster, designated generally 34. As seen in FIG. 2, the holster 34 can be provided with a spring-type belt clip 33 for a purpose described below. Such holsters are well known in the art.

The securement device 11 includes the mounting device 14 that is operable to effect a mounting of the securement device 11 within a vehicle as described herein. As best seen in FIG. 2, the mounting device 14 includes a mounting plate 40. The mounting plate 40 is preferably generally planar and is made of a rigid material such as molded plastic or metal alloy. The mounting plate 40 can be provided with a series of openings 41 to reduce weight and material used. As shown, the mounting plate 40 is generally rectangular and can have rounded corners at the junctions between the side and end edges. Notches 43, 44 are provided in each of the top and bottom edges, respectively, for a purpose described below. The mounting plate 40 is also provided with a through aperture 45 that is preferably positioned adjacent one of the ends of the mounting plate 40. Preferably, the aperture 45 is generally round. Position fixing pins 47 are provided adjacent the edge of the aperture 45 and project from opposite side faces 48, 49 of the mounting plate 40. The pins 47 can be molded as an integral part of the mounting plate 40, or can be affixed to the mounting plate 40 through openings therethrough. The pins 47 can be made of metal and be releasably secured to the mounting plate 40.

As best seen in FIG. 2, the mounting device 14 includes an inflatable pillow 55. The inflatable pillow 55 is preferably in the form of a sleeve that fits over the mounting plate 40 and is received in the notches 43, 44 to fix its position relative to the mounting plate 40. In a preferred embodiment, the pillow 55 has two inflatable sides 57 and 59, with one being positioned on each of the opposite sides of the mounting plate 40. A pump device 60, such as a flexible bulb, is connected in flow communication with the pillow 55 via a tube 62 that allows a fluid to flow between the pump 60 and the pillow 55. The pump may be made of a polymeric material such as a thermoplastic or elastomeric material. Such pumps are well known in the art and are used to inflate blood pressure cuffs. A valve 64 is connected in flow communication between the pump 60 and the pillow 55. The valve 64 is used to seal pressurized fluid within the pillow 55, and also allow the pressurized fluid to escape in a selective manner. The pump 60 can be provided with a pair of check valves (not shown), with a first check valve allowing fluid to flow into the pump 60 during a pump filling stroke, while the second check valve prevents fluid flow out of the pillow 55 during the filling stroke. The first check valve prevents flow out of the pump 60, and the second check valve allows fluid flow to the pillow 55 during a pressurizing stroke of the pump 60 to effect inflation of the pillow 55. The valve 64 is closed during inflation of the pillow 55 and opened to bleed fluid from the pillow 55 for deflation of the pillow 55. In a preferred embodiment, the fluid used to inflate the pillow 55 by pumping is air. In use, the retainer 12 is placed in a vehicle in an area that has a wall or panel on each side of the retainer; for example, between the side of a seat and a side of the center console of the vehicle. By inflating the pillow 55, the retainer 12 and the mounting device 14 are held in a location in the vehicle in a releasable manner. The mounting plate 40 can be provided with a cover 67 that will enclose the mounting plate 40 and the pillow 55. The use of a cover 67 can provide additional friction and prevent marring of the walls or panels between which the mounting plate 40 is positioned. As shown, the cover 67 is provided with a through opening 69 that corresponds in position to the through aperture 45 for a purpose described below. The pillow 55 can be made of a coated fabric that is air impermeable. It is to be understood additionally that the pillow 55 can be self-inflating or partially self-inflating by having an open cell foam contained in the air pocket inside the pillow 55, with the final inflation being effected by the pump 60.

In a preferred embodiment, the pillow 55 principally expands laterally outwardly, when inflated, from at least one of the side faces 48, 49, and preferably both side faces of the mounting plate 40. The pillow 55 is also retained against movement relative to the mounting plate 40 by end edges of the notches 43, 44. The inner sleeve 70 of the pillow 55 can be made of a material that resists stretching during inflation of the pillow 55 to help hold the pillow 55 in place in the notches 43, 44. Other means can be provided in addition to or in place of the end edges of the notches 43, 44 to retain the pillow 55 against movement relative to the mounting plate 40 during use. For example, the pillow 55 could be adhesively secured to the mounting plate 40 or removably held in place by hook and loop fastener devices, etc.

The attachment device 16 and its components are best seen in FIGS. 2-4D. The attachment device 16 is operable for securing a retainer 12 to the mounting plate 40 in a removable manner, and allowing for different types of retainers 12 to be secured to the mounting plate 40. In a preferred embodiment, the attachment device 16 is secured to the mounting plate 40, and is configured to permit the retainer 12 to be positioned at various preselected orientations as desired by the user in a indexable manner. As shown in FIG. 2, the attachment device 16 has a first rim 80 and a second rim 82. Both rims 80, 82 are shown as having a generally circular outer perimeter, although other shapes could be used if desired. Additionally, both rims 80, 82 have a generally circular laterally projecting locator flange 84 and 86, respectively, that fit within the aperture 45 to assist in securing the attachment device 16 to the mounting plate 40. The outer perimeter of the flange 84 is sized approximately the same as the perimeter of the aperture 45, while the outer perimeter of the flange 86 is sized to fit within the flange 84 and extend through its opening 88. As shown, the flange 86 has a plurality of notches 90; each positioned and sized to receive therein a respective ear 92 of rim 80 projecting radially inwardly into the opening 88. As shown, each of the ears 92 has a through aperture 94 for a purpose later described. The attachment device rim 80 is also provided with a plurality of radially outwardly projecting tabs 96; each having a through aperture 98 used for a purpose later described. The attachment device rim 82 is configured to be secured to the rim 80, and thereby secure the attachment device 16 to the mounting plate 40 and be positioned within the aperture 45. As seen in FIG. 2, the rim 82 is secured to the rim 80, as with threaded fasteners 100 that each extend through a respective through aperture 102 and are threadably received in threaded apertures 94 in the ears 92 on rim 80. Tightening of the fasteners 100 clamps the mounting plate 40 between clamp flange portions 95, 97 of the rims 80, 82, respectively.

The rims 80, 82 can be secured to the mounting plate 40 in a manner that allows orientation of the attachment device 16 to be selected and locate the retainer 12 in a selected rotational orientation as desired. As shown, each of the rims 80, 82 has an inner face 110 and 112 respectively. The inner faces 110, 112 each have a plurality of recesses 114 formed therein and positioned about the perimeter of each of the faces 110, 112. The recesses 114 are configured to receive therein a pin 47, which will fix the rotational position of the attachment device 16 relative to the mounting plate 40 when the rims 80, 82 are secured to the mounting plate 40. Any suitable number of recesses 114 can be provided. The recesses 114 extend outwardly and preferably generally radially outwardly. Indexing can also be accomplished by other means, such as the aperture 45 having a toothed surface defining the aperture with the plurality of teeth projecting radially inwardly and the locator flange 84 having corresponding teeth projecting radially outwardly and meshing with the teeth forming the aperture 45.

Figure 3A:
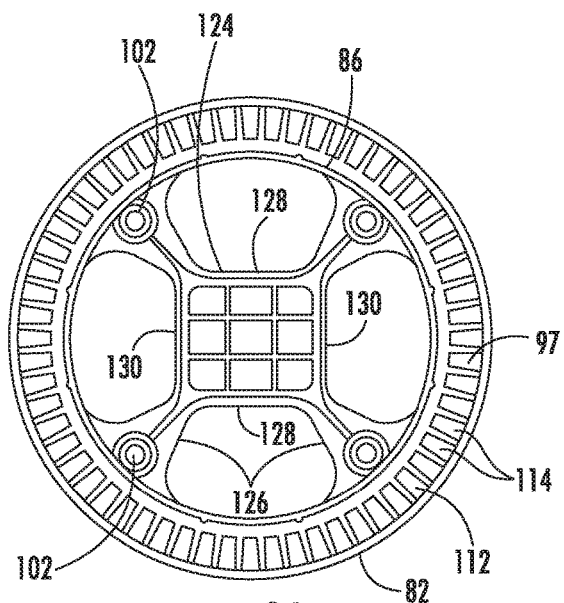
FIGS. 3A-3D include enlarged perspective views, a side elevation view and a front elevation view of a first portion of a retainer mounting device.
Figure 3B:
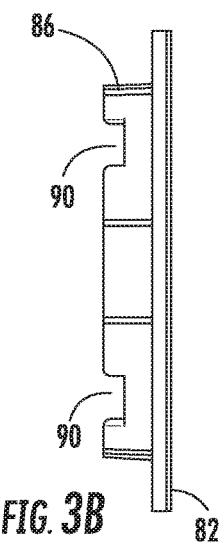
Figure 3C:
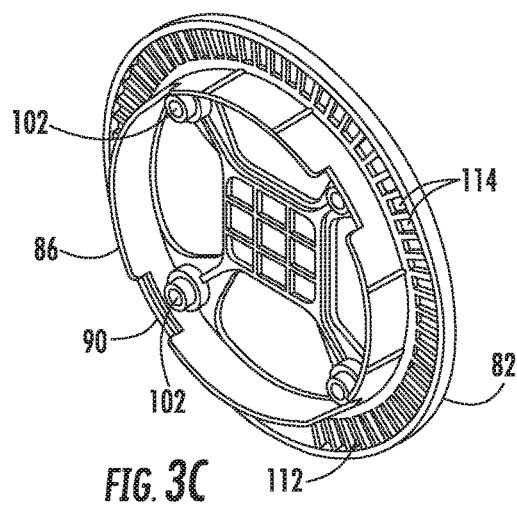
Figure 3D:
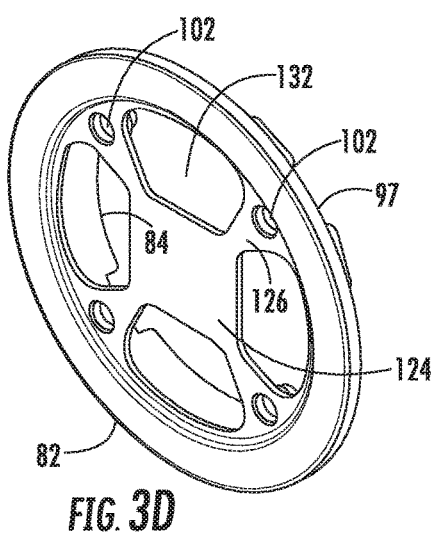
Figure 4A:
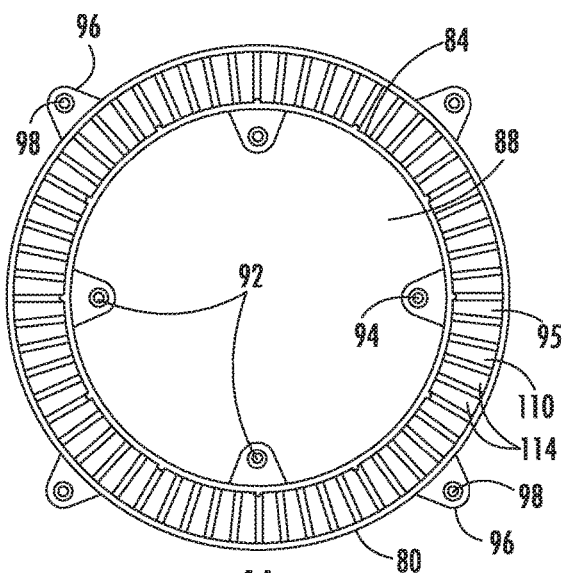
FIGS. 4A-4D include enlarged perspectives views, a side elevation view and a front elevation view of a second portion of a retainer mounting device.
Figure 4B:
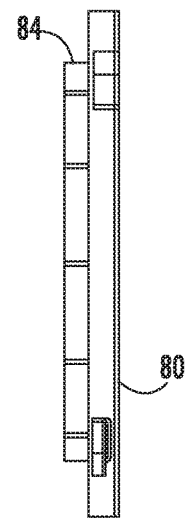
Figure 4C:
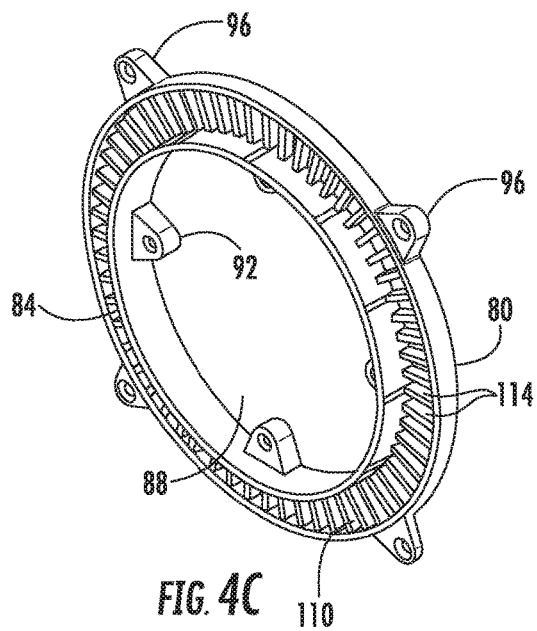
Figure 4D:
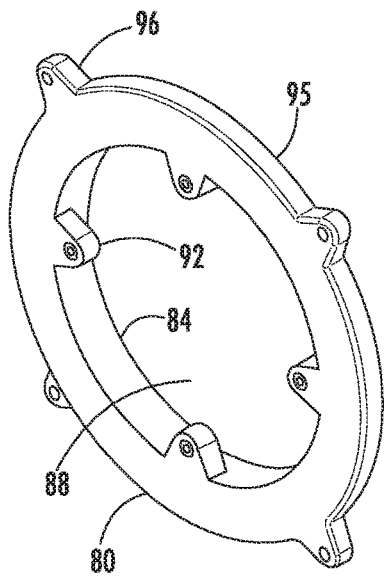

The attachment device 16, as mentioned above, is adapted for attaching a retainer 12 to the mounting plate 40. One form of retainer 12 is a holster, designated generally 34, and as seen in FIG. 2. Such holsters typically have means, such as a belt clip, for carrying the holster mounted to a belt on a person. In the form of holster 34 shown, the belt clip 33 is in the form of a metal hook providing a space between one wall of the holster and an inner portion of the belt clip 33 in which a belt would typically be received. A hook 120 is typically provided on the belt clip 33 to prevent the holster 34 from accidentally becoming separated from the belt on which it is mounted. As best seen in FIG. 3, the rim 82 is provided with a hub 124, generally centrally positioned within the rim 82. The hub 124 is connected to the remainder of the rim 82 as, for example, by radially outwardly projecting spokes 126. As illustrated, the hub 124 is generally rectangular, having four sides providing two pairs of generally parallel side edges 128, 130. In a preferred embodiment, the side edges 128 are longer than the side edges 130 to accommodate different heights of belt clips 33. For example, the edges 130 can be adapted to receive a 1 inch belt clip 33, while the side edges 128 can be used to accommodate a 1½ inch belt clip. As seen in FIG. 3D, the hub 124 is dished outwardly of the remainder of the rim 82 to allow the belt clip 33 to be positioned through the openings 132 positioned between the spokes 126.

The retainer 12, which is in the form of a rectangular box, can be suitably mounted to the attachment device 16 through use of the rim 80. As seen in FIG. 2, the inner surface of the sidewall 30 is positioned adjacent to an outer face 136 of the rim 80. The sidewall 30 is provided with apertures 138 corresponding in number and position to apertures 140 through the tabs 96. Mechanical fasteners 142 that are preferably non-permanent in nature, such as threaded bolts 143 and nuts 144, are utilized for removable attachment. The bolts 143 extend through the apertures 138, 140 and are fastened in place with a respective nut 144. It is to be understood that while the nuts 144 are shown as separate parts, they could be made an integral part of the sidewall 30. In the illustrated embodiment, the container 21 is secured to the rim 80 prior to the rim 80 being secured to the mounting plate 40 along with the rim 82.

As seen in FIGS. 1 and 2, the securement device 11 is provided with an anti-theft attachment device designated generally 148. The device 148 is operable to attach the securement device 11 to the vehicle to resist its unauthorized removal from the vehicle while permitting flexibility in positioning the retainer 12 in the vehicle. As shown, the device 148 is in the form of a flexible tether, such as a coated metal cable 150. The cable 150 has a loop 152 on a distal end. A padlock or the like (not shown), can be used to removably secure the cable 150 to the vehicle, say for example to a seat support. A proximal end of the cable 150 is secured to the mounting plate 40, attachment device 16 and/or retainer 12. As shown, the cable 150 is provided with an eyelet 156 configured to receive a bolt 143 therethrough, with the eyelet 156 being captured on the bolt between the retainer 12 and the rim 80. A recess (not shown) can be provided in the sidewall 30 to receive the eyelet 156 for a flush mounting.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A securement device for removable mounting in a vehicle, the device including:
    a mounting device including a rigid mounting plate, said plate having a through aperture extending between opposite sides thereof, said mounting device further including a selectively inflatable pillow mounted on the plate and a pump connected in flow communication with the pillow through a tube and operable to effect at least partial inflation of the pillow, and a valve operable associated with at least one of the pillow, tube and pump and operable to selectively release pressurized fluid from the pillow;
    an attachment device secured to the plate and being selectively rotatable relative to the plate and fixable in a selected rotated position relative to the plate, said attachment device including first and second rims with a portion of at least one of the rims extending into the aperture with the first rim having a first flange portion positioned on a first side of said plate and the second rim having a second flange portion positioned on a second side of said plate, said attachment device including means adapted to mount a firearm retainer to the securement device; and
    a tether secured to at least one of the mounting device and the attachment device and operable to secure the mounting device to a portion of a vehicle.

2. The securement device of claim 1 including a cover mounted to said plate and covering at least a portion thereof.

3. The securement device of claim 1, wherein the pillow having an expandable portion on each side of the plate and laterally expandable in response to inflation thereof.

4. The securement device of claim 1, wherein at least one of the first and second rims including a locator flange extending into the aperture and said first and second rims being secured together on said plate with a plurality of mechanical fasteners.

5. The securement device of claim 4, wherein the first flange portion having a first surface and the second flange portion having a second surface, said first and second surfaces each being adjacent a respective side surface of said plate, at least one of the first and second surfaces having a plurality of outwardly extending recesses positioned about the periphery of the respective said first or second rim and the plate having at least one pin projecting from at least one said side of said plate adjacent said aperture and positioned to be received in a said recess to resist rotation of the first and second rims relative to the plate when said attachment device is secured to the plate fixing the attachment device in a selected position.

6. The securement device of claim 5, wherein at least one of said first and second rims having a hub connected to its respective flange portion by a plurality of spokes, said spokes in a said rim having openings therebetween, said hub being dished outwardly and being adapted to have a holster mounted thereto.

7. The securement device of claim 5, wherein a firearm retainer being mounted to the attachment device.

8. The securement device of claim 7, wherein the retainer including a container.

9. The securement device of claim 6 including a holster mounted to the hub.

10. The securement device of claim 5, wherein each of said first and second surfaces having a plurality of outwardly extending recesses positioned about the periphery of the respective said first or second rim and the plate having at least one pin projecting from both said sides of said plate adjacent said aperture and positioned to be received in a said recess of a respective said first or second surface to resist rotation of the first and second rims relative to said plate when said attachment device is secured to said plate.

\* \* \* \* \*